(12) United States Patent
Smith et al.

(10) Patent No.: US 11,799,912 B2
(45) Date of Patent: Oct. 24, 2023

(54) NETWORK COMPLIANCE AND ADMISSION CONTROL

(71) Applicant: Cisco Technology, Inc., San Jose, CA (US)

(72) Inventors: Malcolm M. Smith, Richardson, TX (US); Jerome Henry, Pittsboro, NC (US); Pooya Monajemi, Irvine, CA (US); Brian D. Hart, Sunnyvale, CA (US); David S. Kloper, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 17/301,150

(22) Filed: Mar. 26, 2021

(65) Prior Publication Data

US 2022/0311803 A1    Sep. 29, 2022

(51) Int. Cl.
*H04L 9/40* (2022.01)
*H04W 12/08* (2021.01)

(52) U.S. Cl.
CPC ............ *H04L 63/20* (2013.01); *H04W 12/08* (2013.01)

(58) Field of Classification Search
CPC ............................ H04L 1/1614; H04W 12/08

USPC .......................................................... 455/411
See application file for complete search history.

(56) References Cited

U.S. PATENT DOCUMENTS

| | | | |
|---|---|---|---|
| 2015/0055493 A1* | 2/2015 | Suga | H04W 48/16 370/252 |
| 2016/0157266 A1 | 6/2016 | Wang et al. | |
| 2017/0127298 A1 | 5/2017 | Ryu et al. | |
| 2017/0202015 A1* | 7/2017 | Li | H04W 74/02 |
| 2017/0208625 A1 | 7/2017 | Choi et al. | |
| 2018/0302440 A1* | 10/2018 | Hu | H04L 63/1425 |
| 2019/0174543 A1 | 6/2019 | Zhou et al. | |
| 2020/0037356 A1 | 1/2020 | Lou et al. | |
| 2020/0328979 A1* | 10/2020 | Gradisar | H04L 47/2433 |
| 2021/0153158 A1* | 5/2021 | Agarwal | H04L 5/0048 |
| 2022/0303186 A1* | 9/2022 | Marshall | H04L 41/12 |

* cited by examiner

*Primary Examiner* — Fabricio R Murillo Garcia
(74) *Attorney, Agent, or Firm* — Patterson + Sheridan, LLP

(57) ABSTRACT

A device includes a memory and a hardware processor communicatively coupled to the memory. The hardware processor determines that a computing device communicatively coupled to an access point performed an action with respect to the access point and in response to determining that the action causes a deviation from a multi-user uplink policy of the access point, transmits a disciplinary message to the computing device.

15 Claims, 5 Drawing Sheets

NETWORK COMPLIANCE AND ADMISSION CONTROL

TECHNICAL FIELD

Embodiments presented in this disclosure generally relate to network communications. More specifically, embodiments disclosed herein relate to network compliance and admission control.

BACKGROUND

Devices may connect to networks through access points. The networks and the access points may implement and apply certain policies on connected devices. These policies may govern any aspect of the communication to and from the devices (e.g., frequency, length, power, etc.).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
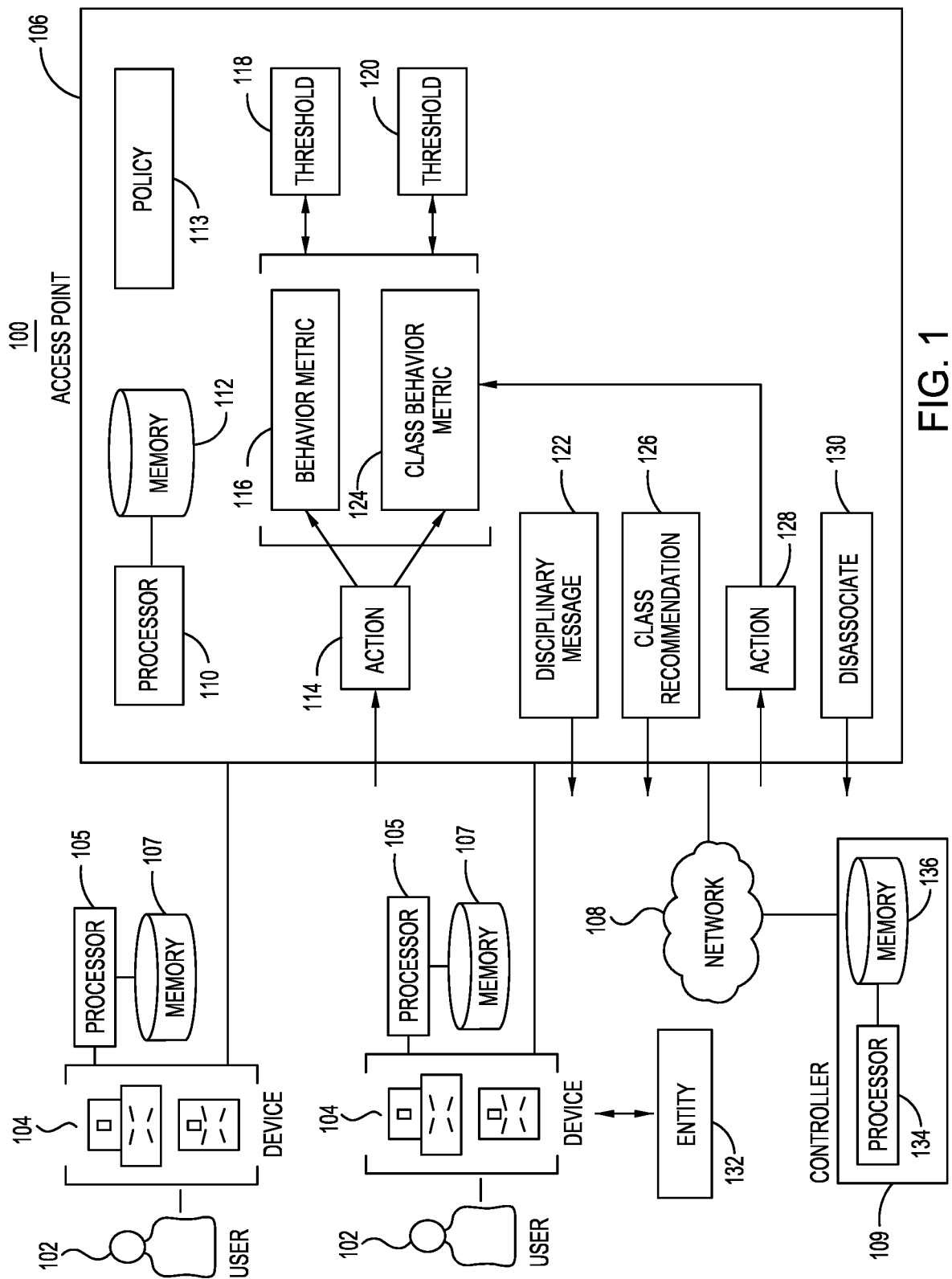
FIG. 1 illustrates an example system.

According to an embodiment, a device includes a memory and a hardware processor communicatively coupled to the memory. The hardware processor determines that a computing device communicatively coupled to an access point performed an action with respect to the access point and in response to determining that the action causes a deviation from a multi-user uplink policy of the access point, transmits a disciplinary message to the computing device. Other embodiments include a method performed by the access point.

According to another embodiment, an apparatus includes a memory and a hardware processor communicatively coupled to the memory. The hardware processor performs an action while connected to an access point and receives, from the access point, a disciplinary message indicating that the action violates a policy of the access point. The hardware processor also communicates the disciplinary message to an entity and receives, from the entity, an instruction regarding the action and the access point.

EXAMPLE EMBODIMENTS

Networks and their access points may apply certain network policies to connected devices. For example, a network or access point may apply a multi-user uplink policy in which connected devices transmit messages according to a schedule set by the network or access point. A connected device, however, may not always adhere to such a policy. For example, the device may opt out of the policy and begin transmitting messages in a single-user mode. When only one or a few devices violate the policy sporadically, there may be little impact on network performance. However, when many devices violate the policy or when a few devices violate the policy consistently, other devices on the network may experience slowdowns and congestion.

This disclosure describes an access point that takes advantage of the connected devices' learning feedback loops to train the devices to adhere to the policies on the network. A connected device may notify an entity (e.g., a manufacturer of the device or a cloud-based machine learning or analytics network) of the actions taken by an access point or a network against the device. The entity may then communicate the actions taken against the device to other devices so that those devices can learn how to adhere to the policies of the access point or network. The access point may take advantage of this learning feedback loop to train connected devices by communicating disciplinary messages to connected devices when those devices violate a network policy. For example, when a connected device violates a policy, the access point may inform the device of the violation and recommend that the device connect to a different access point. The access point may anticipate that the device will forward this notification and recommendation to an entity that alerts other devices of the violation and recommendation so that those devices learn how to properly adhere to the policy when connected to the access point. As another example, if the connected device continues to violate the policy, the access point may inform the device of the violation and disconnect or disassociate the device from the network. The device may then inform the entity of the violation and the disassociation so that the entity can inform other devices how to adhere to the policy when connected to the access point or network. In this manner, the access point takes advantage of the learning feedback loop to train devices to observe the network policies applied by the access point, which improves network performance and reduces congestion and network slowdown, in certain embodiments.

FIG. 1 illustrates an example system 100. As seen in FIG. 1, the system 100 includes one or more devices 104, an access point 106, a network 108, and a controller 109. Generally, the access point 106 provides a device 104 (e.g., a connected device) access to the network 108. The access point 106 may determine when a device 104 violates a network policy of the access point 106 or the network 108. The access point 106 may then communicate one or more messages to the device 104 to train the device 104 how to adhere to the policies of the access point 106 or the network 108. The access point 106 may expect that the device 104 will forward the one or more messages to an entity 132 that informs other devices 104 about the policies of the access point 106 or the network 108, so that those devices 104 will adhere to the policies. As a result of this training, there may be fewer slowdowns and reduced congestion on the access point 106 and the network 108, in particular embodiments.

The device 104 connects to the network 108 through the access point 106. While communicating through the access point 106, the device 104 may adhere to the policies of the access point 106 or the network 108. Some devices 104, however, may opt out of or ignore these policies, which may cause slowdowns or congestion on the network 108. In these instances, these devices 104 may receive messages from the access point 106 that indicate a violation. These devices 104 may forward these messages to an entity 132 as part of a learning feedback loop. The entity 132 may be, for example, a manufacturer of the device 104 or a cloud-based machine learning or analytics network. The entity 132 may analyze the messages and determine the policies of the access point 106 or network 108. The entity 132 may then inform other devices 104 (e.g., devices 104 of a similar class). In response, these devices 104 may learn to adhere to these policies. As a result, the access point 106 or the network 108 may experience fewer slowdowns and reduced congestion, in particular embodiments.

The device 104 includes any suitable device for communicating with components of the system 100 (e.g., the access point 106). As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The device 104 includes a processor 105 and a memory 107, which may be configured to perform any of the actions or functions of the device 104 described herein. The processor 105 is any electronic circuitry, including, but not limited to microprocessors, application specific integrated circuits (ASIC), application specific instruction set processor (ASIP), and/or state machines, that communicatively couples to memory 107 and controls the operation of the device 104. The processor 105 may be 8-bit, 16-bit, 32-bit, 64-bit or of any other suitable architecture. The processor 105 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 105 may include other hardware that operates software to control and process information. The processor 105 executes software stored on memory to perform any of the functions described herein. The processor 105 controls the operation and administration of the device 104 by processing information (e.g., information received from the access point 106, the network 108, and the memory 107). The processor 105 may be a programmable logic device, a microcontroller, a microprocessor, any suitable processing device, or any suitable combination of the preceding. The processor 105 is not limited to a single processing device and may encompass multiple processing devices.

The memory 107 may store, either permanently or temporarily, data, operational software, or other information for the processor 105. The memory 107 may include any one or a combination of volatile or non-volatile local or remote devices suitable for storing information. For example, the memory 107 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 107, a disk, a CD, or a flash drive. In particular embodiments, the software may include an application executable by the processor 105 to perform one or more of the functions described herein.

The network 108 is any suitable network operable to facilitate communication. The network 108 may include any interconnecting system capable of transmitting audio, video, signals, data, messages, or any combination of the preceding. The network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The access point 106 may control access to the network 108. As seen in FIG. 1, the access point 106 includes a processor 110 and a memory 112, which are configured to perform any of the functions or actions of the access point 106 described herein. In particular embodiments, the access point 106 reduces slowdown and congestion over the network 108 by informing devices 104 of network violations so as to take advantage of the devices' 104 learning feedback loop to train the devices 104 to adhere to the policies of the access point 106 or the network 108.

The processor 110 is any electronic circuitry, including, but not limited to microprocessors, application specific integrated circuits (ASIC), application specific instruction set processor (ASIP), and/or state machines, that communicatively couples to memory 112 and controls the operation of the access point 106. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the access point 106 by processing information (e.g., information received from the devices 104, the network 108, and the memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The access point 106 may implement any number of policies to control any aspect of communication over the access point 106 or the network 108. For example, the access point 106 may implement a multi-user uplink (MU-UL) policy 113. According to this policy 113, the access point 106 may schedule uplink times or windows for connected devices 104 according to buffer status reports (BSRs) from the devices 104. The BSRs may indicate a number of messages or packets at each device 104 awaiting transmission. The MU-UL policy 113 may prioritize devices 104 that have been holding more messages or packets for a longer period of time. The access point 106 may schedule uplink times or windows according to this prioritization for these devices 104 to transmit their messages or packets to the access point 106. The access point 106 may then direct these messages or packets to their destinations over the network 108.

In some instances, the devices 104 do not observe or obey the policies 113 of the access point 106 or the network 108. For example, a device 104 may opt out of or ignore the MU-UL policy 113. As a result, the device 104 may transmit a message or packet in a single-user mode, even though a MU-UL transmission opportunity had been offered to the device 104. As a result, the device 104 may communicate messages or packets out-of-turn and steal transmission time from another device 104. The other device 104 may then need to hold onto messages or packets even longer, resulting in slowdowns or congestion.

As another example, a device 104 may opt in and then opt out of the MU-UL policy 113. The device 104 may opt into the MU-UL policy 113, so that the access point 106 believes that the device 104 is adhering to the policies of the access point 106 or the network 108. But when the device 104 has messages or packets awaiting transmission, the device 104 may opt out of the MU-UL policy 113 and transmit these messages or packets in a single-user mode. After transmitting the messages, the device 104 may opt back in to the policy 113. As a result, the device 104 effectively avoids adhering to the MU-UL policy 113, which results in slowdowns or congestion.

The access point 106 may receive or determine an action 114 performed by a device 104. The action 114 may comply with a policy of the access point 106 or the network 108. For example, the action 114 may be a device 104 communicating a message or packet during a transmission window that the access point 106 scheduled for the device 104 according to the MU-UL policy 113. In some instances, the action 114 may be contrary to the policies 113 of the access point 106 or the network 108. For example, the action 114 may be a device 104 communicating a message or packet in a single-user mode, even when a MU-UL opportunity had been offered to the device 104. As another example, the action 114 may be a device 104 opting in and opting out of the MU-UL policy 113. As yet another example, the action 114 may be a device 104 requesting to transmit a large amount of data to improve its prioritization according to the MU-UL policy 113. But after the access point 106 schedules resources for the device 104, the device 104 transmits a smaller amount of data than requested or the device 104 transmits a large amount of meaningless padding.

The access point 106 may update a behavior metric 116 based on the action 114. For example, if the action 114 is in compliance with a policy of the access point 106 or the network 108, the access point 106 may reduce the behavior metric 116 or leave the behavior metric 116 unchanged. If the action 114 violates a policy of the access point 106 or the network 108, the access point 106 may increase the behavior metric 116 by an amount based on the violation. For example, the access point 106 may increase the behavior metric 116 based on a frequency or severity of the violation. The more severe or frequent the violation, the more the amount by which the access point may increase the behavior metric 116. As a result, the behavior metric 116 reflects or represents the frequency or severity of the violations of a connected device 104.

The access point 106 may compare the behavior metric 116 with a threshold 118 to determine if remedial action should be taken against the device 104. For example, if the behavior metric 116 exceeds the threshold 118, the access point 106 may communicate a disciplinary message 122 to the device 104. The disciplinary message 122 may inform the device 104 of the violation and also suggest an action to be taken by the device 104. For example, if the device 104 communicated a message in a single-user mode even when a MU-UL opportunity had been offered to the device 104, the disciplinary message 122 may recommend that the device 104 connect to a different access point. The device 104 may decide whether to connect to another access point or not. As another example, the disciplinary message 122 may recommend that the device 104 communicate over a different band of the access point 106. As yet another example, the disciplinary message 122 may warn the device 104 that its communications will be rate limited.

In certain embodiments, the device 104 communicates the disciplinary message 122 to the entity 132. The entity 132 may analyze the disciplinary message 122 to determine the action 114 of the device 104 that violated a policy of the access point 106 or the network 108. The disciplinary message 122 may recommend that the device 104 connect to a different access point may inform the entity 132 that the action 114 performed by the device 104 violated a policy of the access point 106 or the network 108. In response, the entity 132 may inform the device 104 and other devices 104 about the policies of the access point 106 and the network 108 and how to adhere to these policies in the future. The devices 104 may then change their behavior to observe or obey the policies of the access point 106 and the network 108. For example, the devices 104 may stop transmitting messages or packets in the single-user mode.

In particular embodiments, the access point 106 may also analyze and respond to the behavior of a class of devices 104. For example, the access point 106 may determine the class of the device 104 that performed the action 114. The class may refer to a type, model, manufacturer, brand, or operating system of the device 104. The access point 106 may then update a class behavior metric 124 based on the action 114. The class behavior metric 124 may apply to devices 104 in the same class. As with the behavior metric 116, the access point 106 may increase the class behavior metric 124 by a larger amount if the action 114 indicates a more frequent or more severe violation. Generally, the class behavior metric 124 may be increased a smaller amount based on the action 114 of a single device 104 relative to the behavior metric 116, because the class behavior metric 124 represents the collective actions of a class of devices 104. As a result, the class behavior metric 124 represents a frequency or severity of violations of a class of devices 104.

The access point 106 may compare the class behavior metric 124 to the threshold 118 to determine whether a class of devices 104 should be trained to adhere to the policies of the access point 106 or a network 108. If the class behavior metric 124 exceeds the threshold 118, the access point 106 communicates a class recommendation 126 to devices 104 of that class when those devices 104 attempt to connect to the access point 106. The class recommendation 126 may inform these devices 104 of the violation. The class recommendation 126 may also include a recommended remedial action. For example, the class recommendation 126 may recommend that these devices 104 connect to a different access point 106. The access point 106 may expect that the devices 104 will communicate the class recommendation 126 to the entity 132, and that the entity 132 will analyze the class recommendation 126 and train the devices 104 to adhere to the policies of the access point 106 or the network 108. As the class of devices 104 begin to adhere to the policies of the access point 106 or the network 108, the access point 106 and the network 108 may experience fewer slowdowns and congestion, in particular embodiments.

In some instances, a device 104 may continue to violate the policies of the access point 106 or the network 108, even after the device 104 has been warned of the violation (e.g., through the disciplinary message 122 or the class recommendation 126). In these instances, the access point 106 may assume that the device 104 is intentionally violating the policies of the access point 106 or the network 108. For example, the access point 106 may receive a subsequent action 128 performed by the device 104 that is another violation of a policy 113 of the access point 106 or the network 108 (e.g., the MU-UL policy 113). The access point 106 may update the behavior metric 116 and the class behavior metric 124 based on the violation. The access point 106 may then compare the behavior metric 116 and the class behavior metric 124 to a threshold 120. The threshold 120 may be higher than the threshold 118. If the behavior metric 116 exceeds the threshold 120, the access point 106 may communicate a disassociation command 130 to the device 104. As a result, the access point 106 may disassociate or disconnect the device 104. The device 104 may receive the disassociation command 130 and disconnect itself or be informed of the disassociation. The device 104 may then communicate the disassociation command 130 to the entity 132. The entity 132 may analyze the disassociation command 130 to identify the violation of the device 104, and to train the device 104 further to adhere to the policies of the access point 106. The entity 132 may also inform other devices 104 of the violation and how to adhere to the policy 113 of the access point 106 or the network 108.

In some embodiments, the access point 106 may compare the class behavior metric 124 to the threshold 120 to determine if a class of devices 104 is continuing to violate the policies of the access point 106 or the network 108. If the class behavior metric 124 excess the threshold 120, the access point 106 may issue the disassociation command 130 to a class of connected devices 104 to disconnect each of these devices 104. These devices 104 may communicate the disassociation command 130 to the entity 132. The entity 132 may analyze the disassociation command 130 and inform these devices 104 and other devices 104 of the same class how to adhere to the policies 113 of the access point 106 and the network 108. In this manner, future connected devices 104 are trained to adhere to the policies 113 of the access point 106 and the network 108, which results in fewer slowdowns and reduced congestion, in particular embodiments.

In certain embodiments, the access point 106 may implement a single threshold that embodies both the threshold 118 and the threshold 120. For example, the access point may initially set a threshold at the value of the threshold 118. After the access point 106 communicates the disciplinary message 122 to a device 104, the access point may increase the value of the threshold to the value of the threshold 120. If the device 104 begins adhering to the policies 113 of the access point 106, the access point 106 may reduce the value of the threshold back to the value of the threshold 118.

In some embodiments, the access point 106 communicates its policies 113 to the device 104 when the device 104 connects with the access point 106. In this manner, the device 104 is informed of the policies 113 and can adjust its behavior accordingly prior to communicating over the access point 106.

The access point 106 may take any remedial action against devices 104 that violate the policies of the access point 106 or the network 108. As discussed above, the access point 106 may recommend that the devices 104 connect to a different access point or the access point 106 may disassociate or disconnect the devices 104. As another example, the access point 106 may throttle communications from the devices 104 to reduce the speed at which messages from the devices 104 are processed and communicated by the access point 106. As yet another example, the access point 106 may begin prioritizing communications from other devices 104 to increase the wait time of the devices 104 that violate the policies 113. In this manner, the access point 106 provides reduced services to the devices 104 that violate the policies 113 to signal to these devices 104 to change their behavior.

The controller 109 may control the functions and behavior of several access points 106 in the network 108. For example, the controller 109 may perform any of the functions or actions of the access point 106 described herein. The controller 109 may determine whether the actions 114 or 128 of the device 104 cause the behavior metric 116 or the class behavior metric 124 to exceed the threshold 118 or the threshold 120. The controller 109 may generate and communicate the disciplinary message 122 or the class recommendation 126. The controller 109 may also disassociate the device 104. The controller 109 may be a wireless local area network (WLAN) controller. As seen in FIG. 1, the controller 109 includes a processor 134 and a memory 136, which are configured to perform any of the functions or actions of the controller 109 described herein.

The processor 134 is any electronic circuitry, including, but not limited to microprocessors, application specific integrated circuits (ASIC), application specific instruction set processor (ASIP), and/or state machines, that communicatively couples to memory 136 and controls the operation of the controller 109. The processor 134 may be 8-bit, 16-bit, 32-bit, 64-bit or of any other suitable architecture. The processor 134 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 134 may include other hardware that operates software to control and process information. The processor 134 executes software stored on memory to perform any of the functions described herein. The processor 134 controls the operation and administration of the controller 109 by processing information (e.g., information received from the devices 104, network 108, access point 106, and memory 136). The processor 134 may be a programmable logic device, a microcontroller, a microprocessor, any suitable processing device, or any suitable combination of the preceding. The processor 134 is not limited to a single processing device and may encompass multiple processing devices.

The memory 136 may store, either permanently or temporarily, data, operational software, or other information for the processor 134. The memory 136 may include any one or a combination of volatile or non-volatile local or remote devices suitable for storing information. For example, the memory 136 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 136, a disk, a CD, or a flash drive. In particular embodiments, the software may include an application executable by the processor 134 to perform one or more of the functions described herein.

Figure 2:
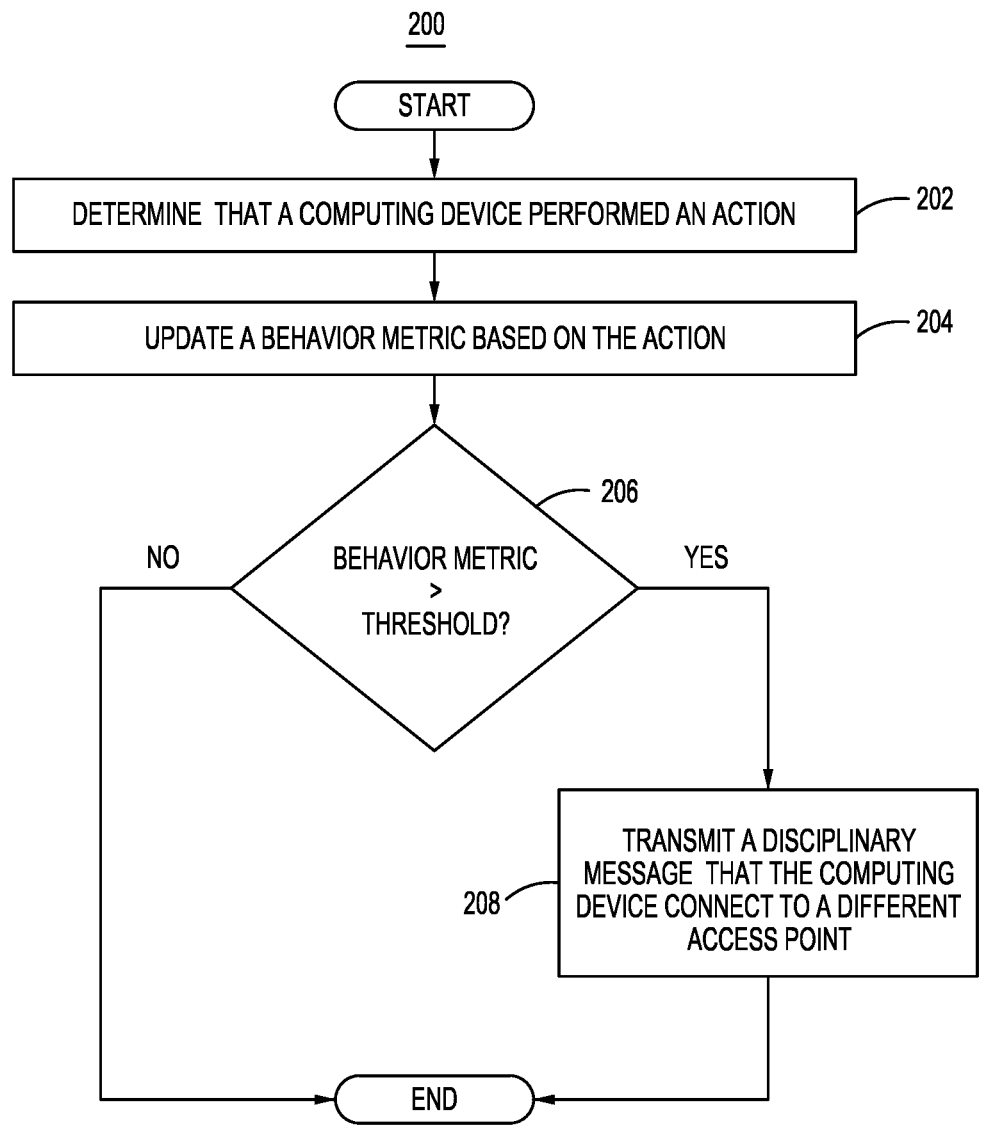
FIG. 2 is a flowchart of an example method in the system of FIG. 1.

FIG. 2 is a flowchart of an example method 200 in the system 100 of FIG. 1. The access point 106 may perform the method 200. In particular embodiments, by performing the method 200, the access point 106 trains a connected device 104 to adhere to the policies of the access point 106, which reduces slowdowns and congestion.

In block 202, the access point 106 determines that a computing device 104 performed an action 114. The action 114 may be in compliance with a policy 113 of the access point 106 (e.g., a MU-UL policy 113). In some instances, the action 114 may violate this policy 113. For example, the device 104 may transmit a message in a single-user mode even though a MU-UL opportunity had been offered to the device 104. As another example, the device 104 may opt in and opt out of the policy 113 or opt out and opt in to the policy 113.

In block 204, the access point 106 updates a behavior metric 116 based on the action 114. If the action 114 complies with the policies of the access point 106, the access point 106 may reduce or leave unchanged the behavior metric 116. If the action 114 violates a policy of the access point 106, the access point 106 may increase the behavior metric 116. The amount by which the access point 106 increases the behavior metric 116 may depend on a frequency or severity of the violation. For example, the more frequent or severe the violation is, the more the access point 106 increases the behavior metric 116. As a result, the behavior metric 116 represents the frequency or severity of the violations of the device 104.

In block 206, the access point 106 determines whether the behavior metric 116 exceeds a threshold 118. The access point 106 may compare the behavior metric 116 to the threshold 118 to determine if remedial action should be taken against the device 104. If the behavior metric 116 does not exceed the threshold 118, the access point 106 may conclude the method 200. If the behavior metric 116 exceeds the threshold 118, the access point 106 transmits a disciplinary message 122 that recommends that the computing device 104 connect to a different access point in block 208. The access point 106 may expect that the device 104 will communicate the disciplinary message 122 to an entity 132 (e.g., a manufacturer of the device 104 or a cloud-based machine learning or analytics network). Based on the disciplinary message 122, the entity 132 may train the device 104 and other devices 104 how to adhere to the policies 113 of the access point 106 or the network 108. As a result, the access point 106 may experience fewer slowdowns and reduced congestion in particular embodiments.

Figure 3:
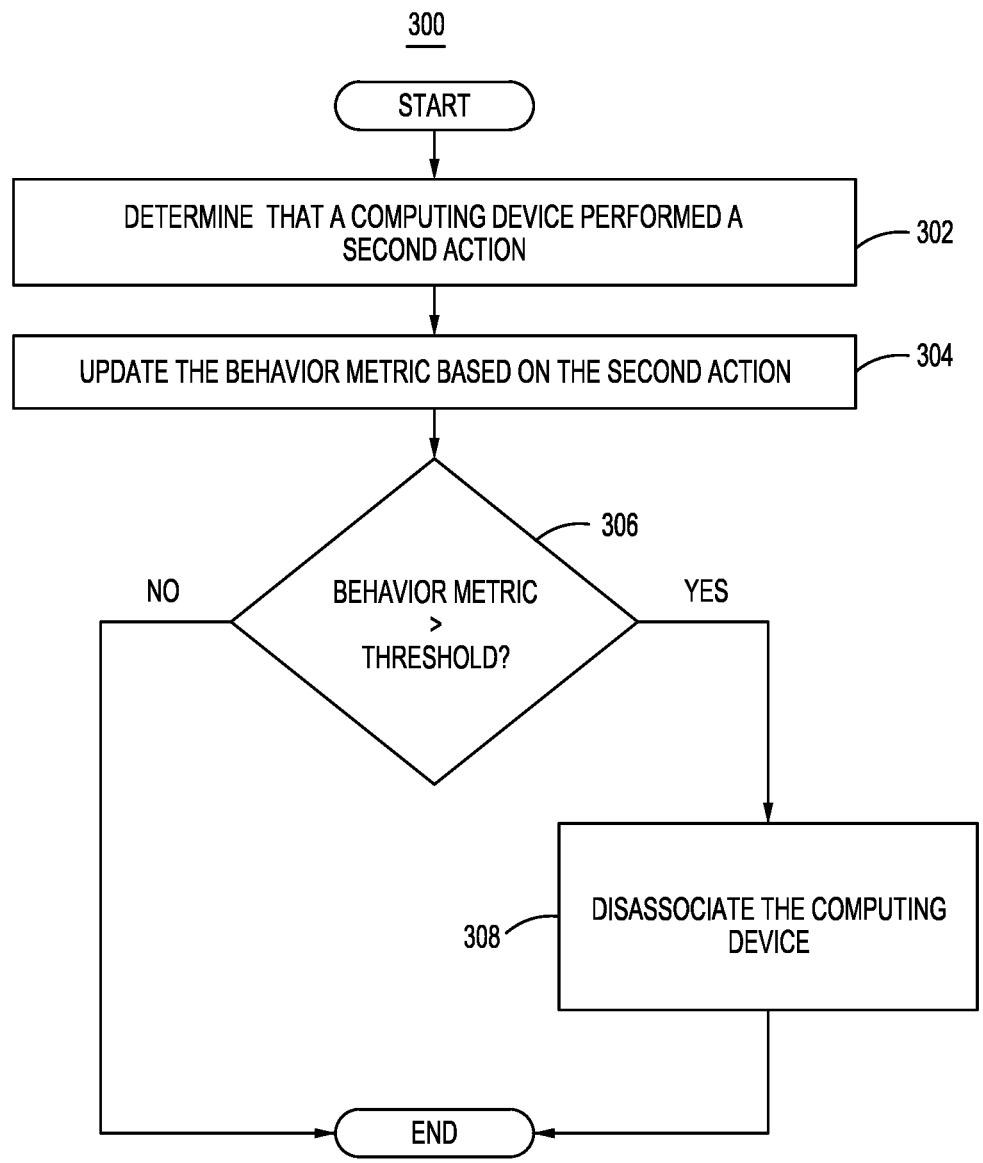
FIG. 3 is a flowchart of an example method in the system of FIG. 1.

FIG. 3 is a flowchart of an example method 300 in the system 100 of FIG. 1. The access point 106 may perform the method 300. In particular embodiments, by performing the method 300, the access point 106 reduces slowdowns and congestion caused by devices 104 that repeatedly violate the policies of the access point 106.

In block 302, the access point 106 determines that the device 104 performed a second action 128. The second action 128 may be a subsequent violation of the policies of the access point 106 after the access point 106 had previously communicated a disciplinary message 122 to the device 104. The access point 106 updates the behavior metric 116 based on the second action 128 in block 304. Because the second action 128 represents a subsequent violation of the device 104, the access point 106 may increase the behavior metric 116 by a larger amount.

The access point 106 may compare the behavior metric 116 with a threshold 120 to determine if more severe remedial action should be taken against the device 104. In block 306, the access point 106 compares the behavior metric 116 with the threshold 120. If the behavior metric 116 does not exceed the threshold 120, the access point 106 may conclude the method 300. If the behavior metric 116 exceeds the threshold 120, the access point 106 disassociates the computing device 104 in block 308. The access point 106 may communicate a disassociation command 130 to the device 104. As a result, the device 104 is disconnected from the access point 106. The access point 106 may expect that the device 104 will communicate the disassociation command 130 to the entity 132 and that the entity 132 will analyze the disassociation command 130 to determine the violation of the device 104 and to inform the device 104 and other devices 104 how to adhere to the policies 113 of the access point 106 or the network 108. As a result, the device 104 and the other devices 104 are trained to observe and obey the policies of the access point 106, which reduces repeated violations of the policies 113 of the access point 106.

Figure 4:
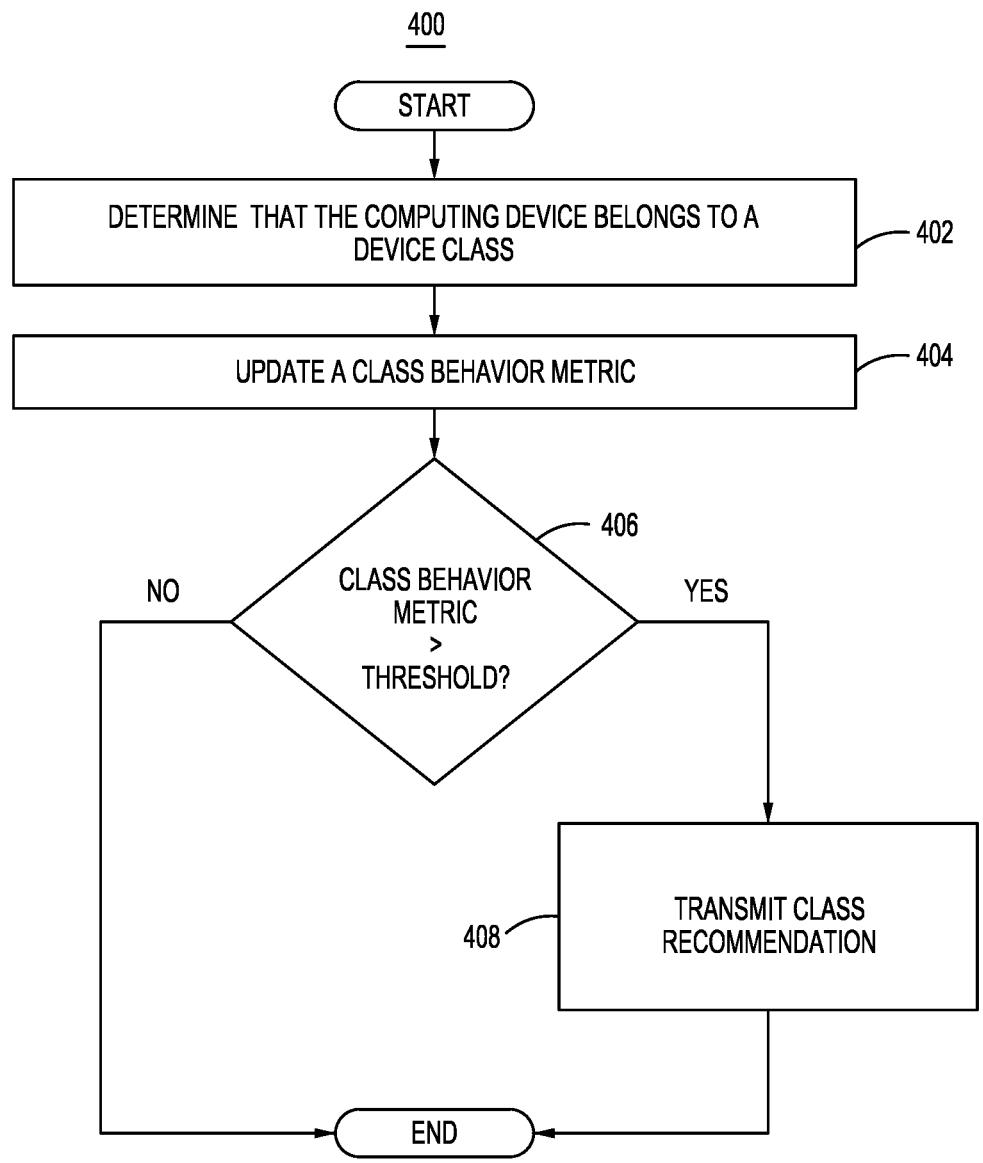
FIG. 4 is a flowchart of an example method in the system of FIG. 1.

FIG. 4 is a flowchart of an example method 400 in the system 100 of FIG. 1. The access point 106 may perform the method 400. In particular embodiments, by performing the method 400, the access point 106 reduces slowdown and congestion caused by classes of devices 104. The method of 400 may be performed after block 202 in the method 200. In some embodiments, the method 400 may be performed in parallel with the rest of the method 200 after block 202.

In block 402, the access point 106 determines that the computing device 104 belongs to a device class. The class may refer to a type, model, manufacturer, brand, or operating system of the device 104. In block 404, the access point 106 updates a class behavior metric 124 based on the action 114. The class behavior metric 124 may represent the severity and frequency of the violations of the class of devices 104. The access point 106 may analyze the class behavior metric 124 to determine if remedial action should be taken against the class of devices 104.

In block 406, the access point 106 compares the class behavior metric 124 to the threshold 118. If the class behavior metric 124 does not exceed the threshold 118, the access point 106 may conclude the method 400. If the class behavior metric 124 exceeds the threshold 120, the access point 106 transmits a class recommendation 126 in block 408 to the devices 104 in the class when those devices 104 attempt to connect to the access point 106. The class recommendation 126 may indicate the violation and may recommend that the class of devices 104 connect to a different access point. The access point 106 may expect that the devices 104 will communicate the class recommendation 126 to the entity 132 and that the entity 132 will analyze the class recommendation 126 to identify the violation and to train the class of devices 104 how to adhere to the policies 113 of the access point 106. As a result, the access point experiences fewer slowdowns and reduced congestion caused, in particular embodiments.

Figure 5:
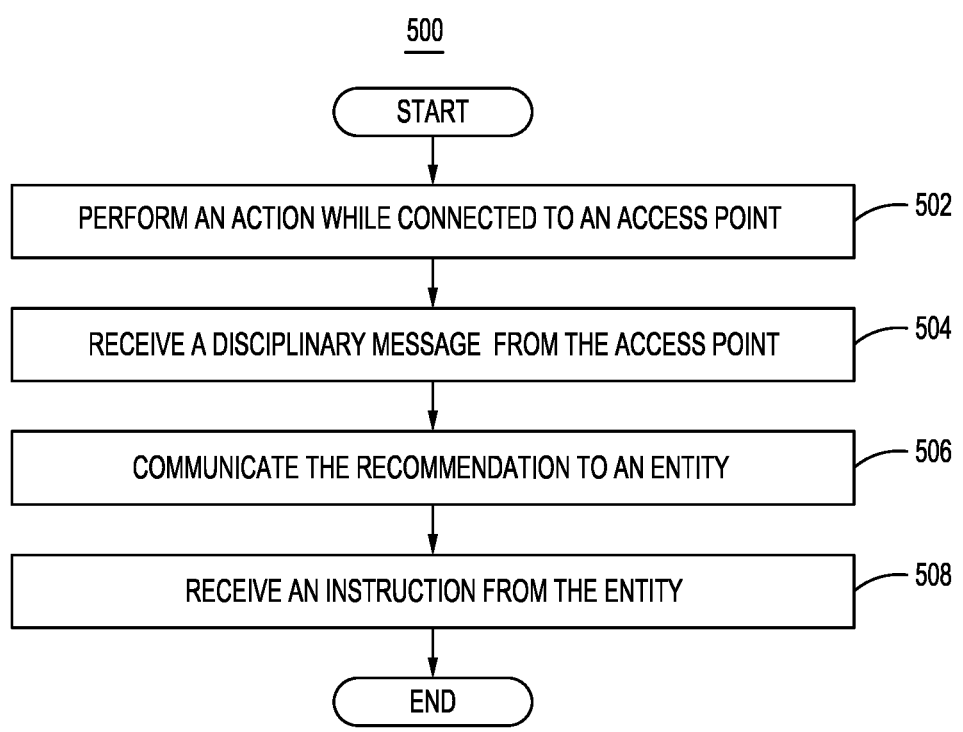
FIG. 5 is a flowchart of an example method in the system of FIG. 1.

FIG. 5 is a flowchart of an example method 500 in the system 100 of FIG. 1. The device 104 may perform the method 500. In particular embodiments, by performing the method 500, the device 104 may be instructed and trained to adhere to the policies 113 of the access point 106 and the network 108, which reduces slowdowns and congestion.

In block 502, the device 104 performs an action 114 while connected to an access point 106. The action 114 may violate a policy 113 of the access point 106. For example, the device 104 may transmit a message in a single-user mode when the access point 106 had previously offered the device 104 a multi-user uplink opportunity. As another example, the device 104 may opt in or opt out of a policy 113 (e.g., a multi-user uplink policy 113) of the access point 106. The access point 106 may update a behavior metric 116 for the device 104 based on the action 114. If the action 114 violates a policy 113 of the access point 106, the access point 106 may increase the behavior metric 116 by an amount that depends on the frequency or severity of the violation.

In block 504, the device 104 receives a disciplinary message 122 from the access point 106. The access point 106 may have communicated the disciplinary message 122 to the device 104 in response to the behavior metric 116 for the device 104 exceeding a threshold 118. The disciplinary message 122 may indicate the violation of the policy 113 and may include a disciplinary measure. For example, the disciplinary message 122 may recommend that the device 104 connect to a different access point 106.

In block 506, the device 104 communicates the disciplinary message 122 to an entity 132. The entity 132 may be a manufacturer of the device 104 or a cloud-based machine learning or analytics network. The entity 132 may analyze the disciplinary message 122 to determine the violation. The entity 132 may then inform the device 104 or a class of devices 104 about the violation and how to adhere to the policies 113 of the access point 106 in the future. In block 508, the device 104 receives an instruction from the entity 132 that instructs the device 104 how to adhere to the policies 113 of the access point 106 in the future.

In summary, this disclosure describes an access point 106 that takes advantage of connected devices' 104 learning feedback loops to train the devices 104 to adhere to the policies 113 of the access point 106 or the network 108. A device 104 may notify an entity 132 (e.g., a manufacturer of the device or a cloud-based machine learning or analytics network) of the remedial actions taken by the access point 106 against the device 104. The entity 132 may then inform the device 104 and other devices 104 how to adhere to the policies of the access point 106 or network 108.

The access point 106 may take advantage of this learning feedback loop to train connected devices 104 by communicating disciplinary messages to connected devices 104 when those devices violate a policy 113. For example, when a connected device 104 violates a policy 113, the access point 106 may inform the device 104 of the violation and recommend that the device 104 connect to a different access point. The access point 106 may anticipate that the device 104 will forward this notification and recommendation 122 to an entity 133 that alerts other devices 104 of the violation and recommendation 122 so that those devices 104 learn how to properly adhere to the policy 113 when connected to the access point 106. As another example, if the connected device 104 continues to violate the policy 113, the access point 106 may inform the device 104 of the violation and disconnect or disassociate the device 104 from the network 108. The device 104 may then inform the entity 132 of the violation and the disassociation so that the entity 132 can inform other devices 104 how to adhere to the policy 113 when connected to the access point 106 or network 108. In this manner, the access point 106 takes advantage of the learning feedback loop to train devices 104 to observe the policies 113 implemented by the access point 106, which improves network performance and reduces congestion and network slowdown, in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A device comprising:
a memory; and
a hardware processor communicatively coupled to the memory, the hardware processor configured to:
schedule, based on a buffer status report from a computing device communicatively coupled to an access point and according to a multi-user uplink policy implemented by the access point, a transmission for the computing device, wherein the buffer status report indicates a number of messages at the computing device awaiting transmission;
determine that the computing device transmitted a message out-of-turn using a single user mode rather than transmitting the message according to the multi-user uplink policy; and
in response to determining that the computing device transmitted the message out-of-turn using the single user mode, transmit a disciplinary message to the computing device, wherein the disciplinary message comprises one of (i) a first recommendation that the computing device communicate over a different band of the access point, (ii) a second recommendation that the computing device connect to a different access point, or (iii) a warning that communications from the computing device will be rate limited.

2. The device of claim 1, wherein the hardware processor is further configured to determine that an action performed by the computing device causes a behavior metric to exceed a threshold set by the multi-user uplink policy.

3. The device of claim 2, wherein the hardware processor is further configured to:
determine that the computing device performed a second action; and
in response to determining that the second action causes the behavior metric to exceed a second threshold, disassociate the computing device from the access point.

4. The device of claim 2, wherein the hardware processor is further configured to:
determine that the computing device belongs to a class of devices; and
in response to determining that the action causes a class behavior metric to exceed the threshold, communicate a recommendation that a first device of the class of devices connect to a different access point.

5. The device of claim 4, wherein the recommendation is communicated when the first device of the class of devices attempts to connect to the access point.

6. The device of claim 1, wherein the hardware processor is further configured to determine that the computing device opted out and in or in and out of the multi-user uplink policy.

7. The device of claim 1, wherein the disciplinary message is communicated to a manufacturer of the computing device.

8. A method comprising:
scheduling, based on a buffer status report from a computing device communicatively coupled to an access point and according to a multi-user uplink policy implemented by the access point, a transmission for the computing device, wherein the buffer status report indicates a number of messages at the computing device awaiting transmission;

determining that the computing device transmitted a message out-of-turn using a single user mode rather than transmitting the message according to the multi-user uplink policy; and in response to determining that the computing device transmitted the message out-of-turn using the single user mode, transmitting a disciplinary message to the computing device, wherein the disciplinary message comprises one of (i) a first recommendation that the computing device communicate over a different band of the access point, (ii) a second recommendation that the computing device connect to a different access point, or (iii) a warning that communications from the computing device will be rate limited.

9. The method of claim 8, further comprising determining that an action performed by the computing device causes a behavior metric to exceed a threshold set by the multi-user uplink policy.

10. The method of claim 9, further comprising:
determining that the computing device performed a second action; and
in response to determining that the second action causes the behavior metric to exceed a second threshold, disassociating the computing device from the access point.

11. The method of claim 9, further comprising:
determining that the computing device belongs to a class of devices; and
in response to determining that the action causes a class behavior metric to exceed the threshold, communicating a recommendation that a first device of the class of devices connect to a different access point.

12. The method of claim 11, wherein the recommendation is communicated when the first device of the class of devices attempts to connect to the access point.

13. The method of claim 8, further comprising determining that the computing device opted out and in or in and out of the multi-user uplink policy.

14. The method of claim 8, wherein the disciplinary message is communicated to a manufacturer of the computing device.

15. An apparatus comprising:
a memory; and
a hardware processor communicatively coupled to the memory, the hardware processor configured to:
transmit, to an access point while connected to the access point, a buffer status report indicating a number of messages awaiting transmission at the apparatus, wherein a transmission for a message of the number of messages is scheduled according to a multi-user uplink policy implemented by the access point;
transmit the message out-of-turn using a single user mode rather than transmitting the message according to the multi-user uplink policy;
receive, from the access point, a disciplinary message indicating that the message was transmitted out-of-turn using the single user mode, wherein the disciplinary message comprises one of (i) a first recommendation that the apparatus communicate over a different band of the access point, (ii) a second recommendation that the apparatus connect to a different access point, or (iii) a warning that communications from the apparatus will be rate limited;
communicate the disciplinary message to an entity; and
receive, from the entity, an instruction regarding the access point.

* * * * *